July 25, 1961

C. C. MILES, JR 2,993,731

HEADER LOCK

Filed July 28, 1958

*INVENTOR.*
CHARLES C. MILES Jʳ

BY

ATTORNEY

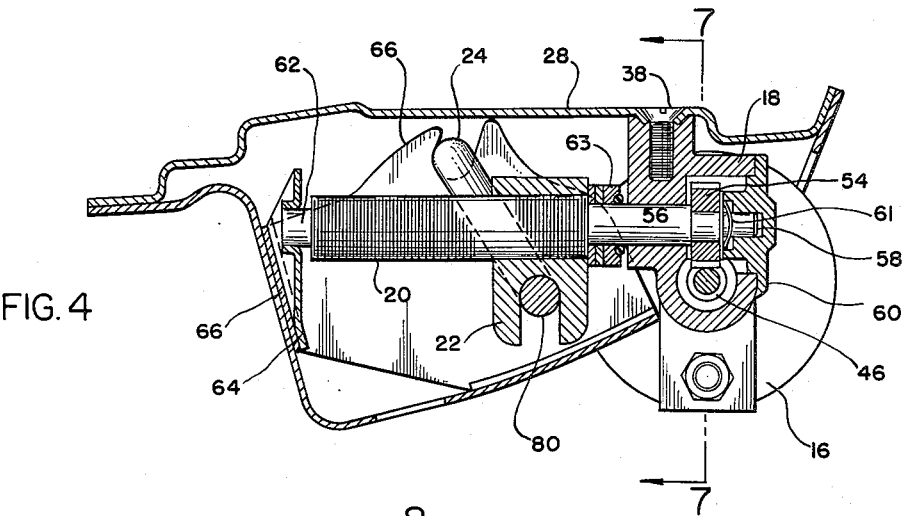
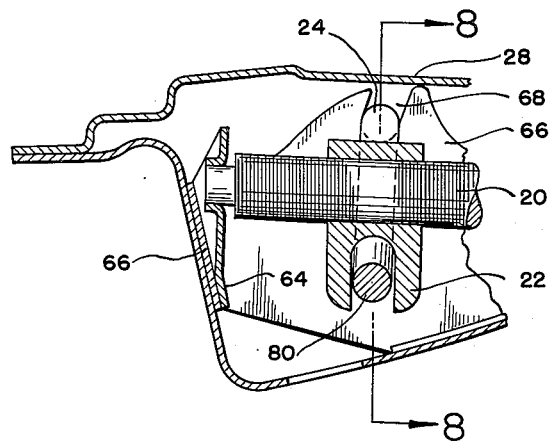
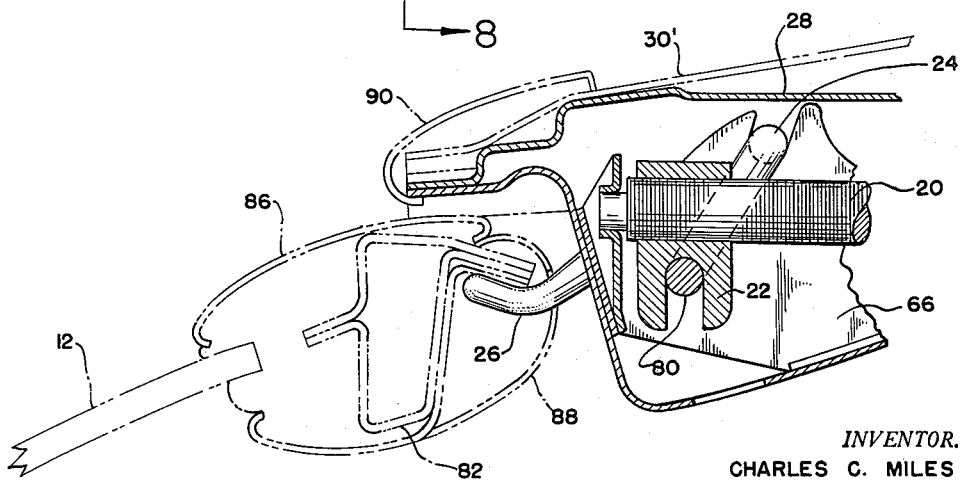

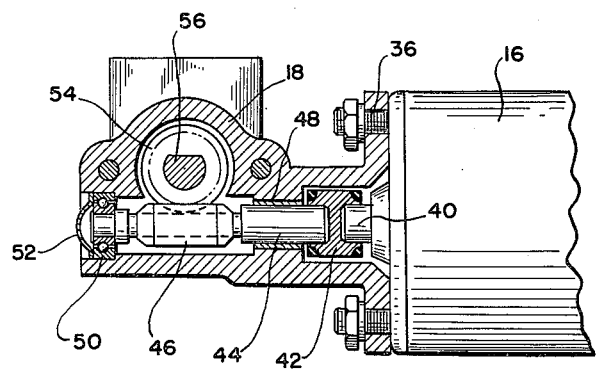
FIG.7
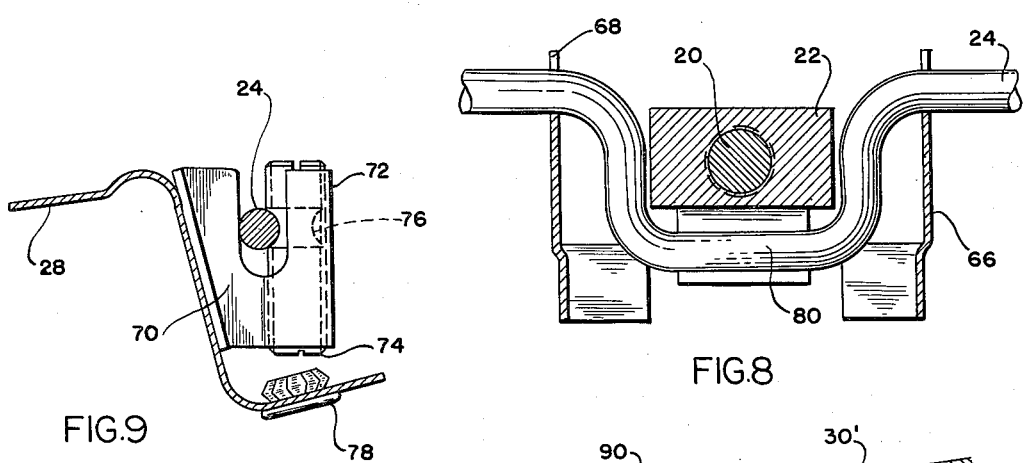
FIG.8
FIG.9
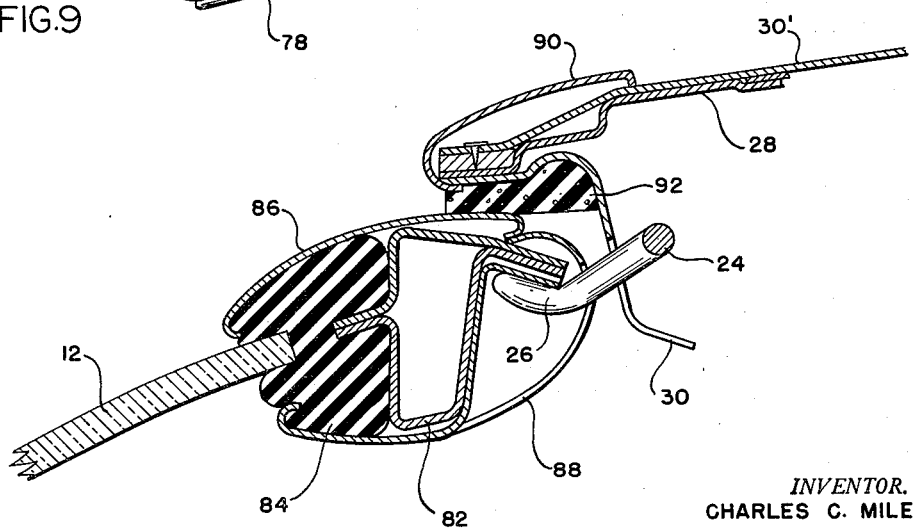
FIG.10
INVENTOR.
CHARLES C. MILES JR
BY
ATTORNEY July 25, 1961 C. C. MILES, JR 2,993,731
HEADER LOCK Filed July 28, 1958 5 Sheets-Sheet 4

INVENTOR.
CHARLES C. MILES JR
BY
ATTORNEY

INVENTOR.
CHARLES C. MILES JR
BY
ATTORNEY

United States Patent Office 2,993,731
Patented July 25, 1961

2,993,731
HEADER LOCK
Charles C. Miles, Jr., Detroit, Mich., assignor to Dura Corporation, a corporation of Michigan
Filed July 28, 1958, Ser. No. 751,278
3 Claims. (Cl. 296—120)

This invention relates to automobile bodies of the convertible type and particularly to an automatic, power-operated header latch for locking the header or front portion of the convertible top to the windshield header of the automobile.

It has been long recognized that so called "automatic tops" for convertible automobiles are not, in fact, automatic because it is necessary for the driver to manually unlock the top header before energizing the power means to lower the top and to manually latch or lock the same in place after the power means has raised the top.

The prior art shows several more or less successful attempts to render the top completely automatic, but the mechanisms employed are expensive and troublesome from the maintenance standpoint.

Accordingly, it is the primary object of my invention to provide an improved automatic, power actuated header latch for convertible tops that is simple in design, positive in operation, and durable in service.

Other objects and advantages of my improved device will appear from the following specification which, taken in conjunction with the accompanying drawings, discloses one preferred form of the header latch.

In the drawings, in which reference characters have been used to designate like parts referred to herein:

FIG. 4 is a sectional view taken on line 4—4 of FIG. 3;

FIG. 5 is a fragmentary sectional view similar to FIG. 4, but showing the operating parts in a different position;

FIG. 6 is a view similar to FIGS. 4 and 5, showing the operating parts in a still different position and showing one of the latching members;

FIG. 7 is a sectional view taken on the line 7—7 of FIG. 4;

FIG. 8 is a section along line 8—8 of FIG. 5;

FIG. 9 is a section along line 9—9 of FIGS. 2 and 3;

FIG. 10 is a section along line 10—10 of FIGS. 2 and 3;

Figure 1:
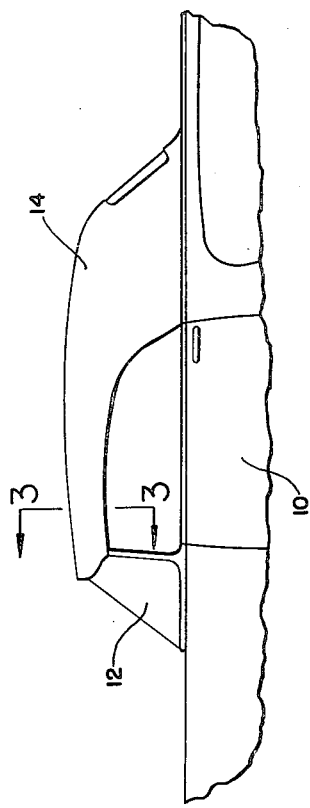
FIG. 1 is a side elevation of a portion of a convertible automobile body of the type in which the present invention may be embodied.

Referring to the drawings, it may be seen that I have shown a body 10 having a windshield 12 and a top 14. The latter is of the flexible type, well known in the art, which comprises fabric stretched over folding bows, slat irons, and side rails, and is adapted to be lowered and raised by means of a hydraulic or electric power unit disposed in the body rear portion. It is, however, desired to point out that my header latch herein described is applicable equally well to the so called "retractible hard top," which is currently coming into use.

My power actuated latch mechanism comprises essentially (see FIG. 11 particularly) an electric motor 16, a gearbox 18, an actuating screw 20, an actuating nut 22, and a torsion bar or crank member 24 having latch portions or hooks 26 at its opposite ends.

The aforesaid mechanism is carried in the top header 28 (FIGS. 4–6) which is made of elongated steel members welded together to form a box-structure which extends transversely of the top structure at the front thereof. The top header is covered by a flexible fabric cover 30' and is linked to other top members by side rails (not shown) such that the top may be folded as well known in the art.

The power actuated latching mechanism is suitably mounted in the box-structure of the header, as will be described, and is entirely concealed therein except for the hooks 26 which protrude outwardly through apertures 30, as will be readily understood.

The motor 16 is fastened at its rear end to the header wall by a bracket 32 which is welded or riveted to the motor end plate and riveted to the header. The front or drive end of the motor is secured by studs 36 (FIG. 7) to the gearbox 18. The latter is preferably a die casting and is secured to the upper stamping of the header by screws 38 (FIG. 4).

The gearbox has a flared open end facing the motor and is provided with longitudinal and transverse bores disposed in different planes, as more clearly shown in FIGS. 4 and 7. The motor drive shaft 40 is coupled by means of an aligning coupling 42 to a driven shaft 44 which is formed with a worm 46. The shaft 44 is journaled in the gearbox by means of a bushing 48 and a ball bearing 50. An end cap 52 closes the end of the longitudinal bore and seals in the lubricant.

The worm 46 meshes with a worm wheel 54 carried by the reduced end 56 of the screw 20 (FIGS. 4 and 7). The latter is journaled in the gear box 18, has a flattened shoulder in which the wheel 54 is mounted and a further reduced portion 58 which is journaled in the housing cover 60. A snap ring 61 retains the wheel in place. An anti-jamming spacer 63 is secured on the screw 20 by a snap ring as shown. This spacer or abutment member comprises two steel collars separated by a softer collar of nylon or Teflon and acts as a stop for the nut 22. The screw 20 has a reduced forward end portion 62 which is rotatably supported in a stamped bracket 64 welded to a saddle member 66 which, in turn, is welded to the inner wall of the header 28 at the transverse midportion thereof. The nut 22 threadedly engages the screw 20 and is adapted to be traversed along the screw forwardly or backwardly in accordance with the direction of rotation of the motor 16.

Figure 3:
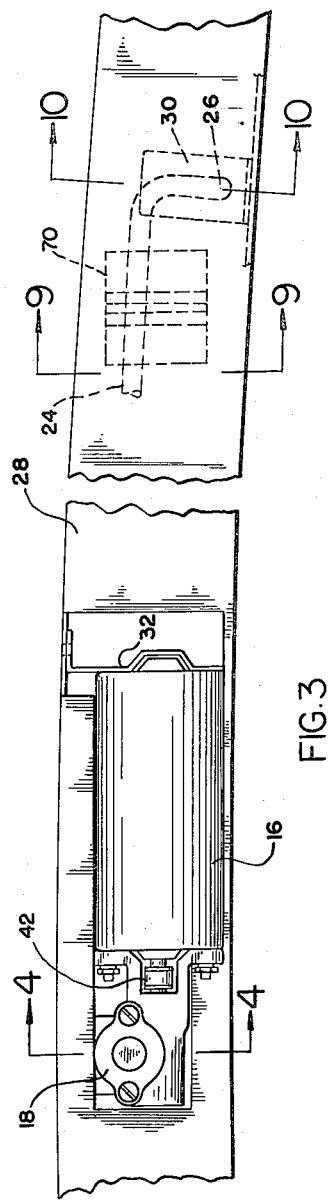
FIG. 3 is a fragmentary view of the top header, on an enlarged scale, viewed as indicated by the arrows 3—3 on FIG. 1.
Figure 11:
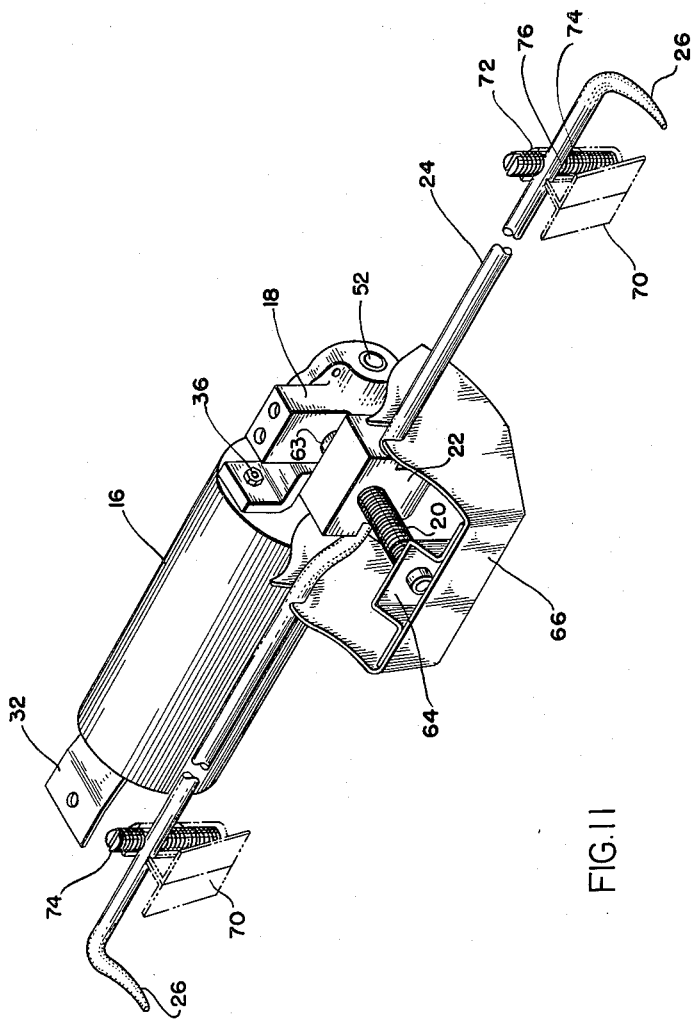
FIG. 11 is a perspective view of the latch mechanism.

The latching bar 24, as will be more clearly seen from FIGS. 3, 8 and 11, is loosely supported in slots 68 provided in the oppositely disposed transversely spaced walls of the saddle member 66. The latter is welded to the inner front wall and the bottom wall of the box-section top header 28 and constitutes a firm mounting for the central portion of the torsion bar 24 and for the front end of the screw 20.

Welded to the inner front wall of the top header adjacent each end thereof are brackets 70. Each of these brackets has an internally threaded portion 72 which carries a screw 74. The latter has a reduced portion 76 which engages the torsion latch bar 24 near the end as clearly shown in FIG. 11. The screw 74 has slots in the bottom and top ends thereof which permits the end portion of the bar 24 to be adjusted by means of a screw driver. After assembly of the header, the ends of the latch bar may be adjusted through holes provided in the bottom wall of the header and closed by snap buttons 78 (FIG. 9).

The bar 24 is formed with a crank portion 80 at its center, which crank portion is loosely engaged by the bifurcated lower end of the nut 22. It will be readily understood that movement of the nut 22 to and fro on the screw 20 will swing the crank 80 and the hook portions 26 about the main axis of the bar 24.

Reference is now made to FIG. 10 which shows the top header 28 latched to the automobile windshield header 82. The latter is a structural member of the automobile body 10 and supports the windshield 12 at the top thereof, a yieldable mounting pad 84 being provided as a seal as is common in the art. The windshield header 82 has a trim member 86 provided with openings 88 at each end which receive the end portions 26 of the torsion latch bar 24.

The top header is provided with a metal trim member 90, and a resilient sealing pad 92 is cemented or otherwise secured to the header 28 as is common practice.

Figure 2:
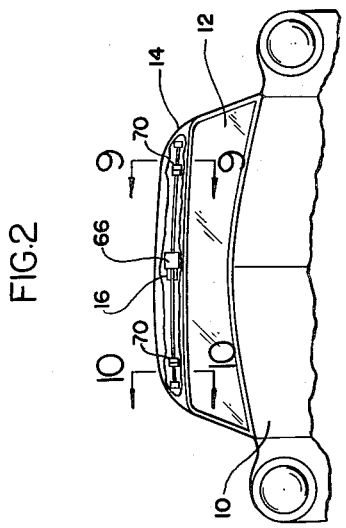
FIG. 2 is a front elevation of the body with a portion of the top broken away to show the position occupied by my header latch mechanism.

As so far described, it may be seen that when the top is in closed or raised position as shown in FIGS. 1 and 2, the latch mechanism will be in the positions shown in FIGS. 6, 8, 10 and 11, with the nut 22 in extreme forward position and the hook portions 26 of the latch bar 24 in their outer extended position. With the parts in this position, the bar 24 is under torsional stress with the end portions 26 exerting substantial upward pressure in the windshield header 82 such that the sealing pad 92 is under compression.

The top header 28 is thus firmly secured to the windshield header 82, and the joint between is sealed against entry of moisture. Because of the irreversibility of the screw and nut combination 20—22, the whole mechanism is locked.

When it is desired to lower the top, the motor 16 is energized in such direction that nut 22 is caused to travel toward the rear from the position shown in FIG. 6 to that shown in FIG. 5, and then to that shown in FIG. 4. In the latter position, the latch is completely disengaged and the end hooks 26 are substantially withdrawn through the apertures 30. The top may then be lowered.

When it is desired to raise the top, the driver may do so manually or by operating the power lift usually provided, and when the top header engages the windshield header (or about that instant) the motor 16 is energized to drive the nut 22 forwardly from the FIG. 4 position. The latch bar 24 will rotate in response to forward swing of the crank 80, and the end portions 26 will swing out through the openings 30 and engage the undersurface of the windshield header 82. The parts are preferably adjusted such that when the nut 22 reaches its FIG. 5 position, the two headers are firmly engaged, and movement of the nut from FIG. 5 to FIG. 6 position imparts torsional twist to the bar 24 which compresses the sealing pad 92 and rigidly latches the top to the windshield header against any possibility of displacement or rattle in normal use. If desired, locating dowels may be disposed in the top of the windshield header to assure centering of the top header upon closing.

While the latching mechanism has been illustrated and described in connection with a convertible top, it may be used for latching other closures—for example, deck lids, hoods, etc.

Figure 12:
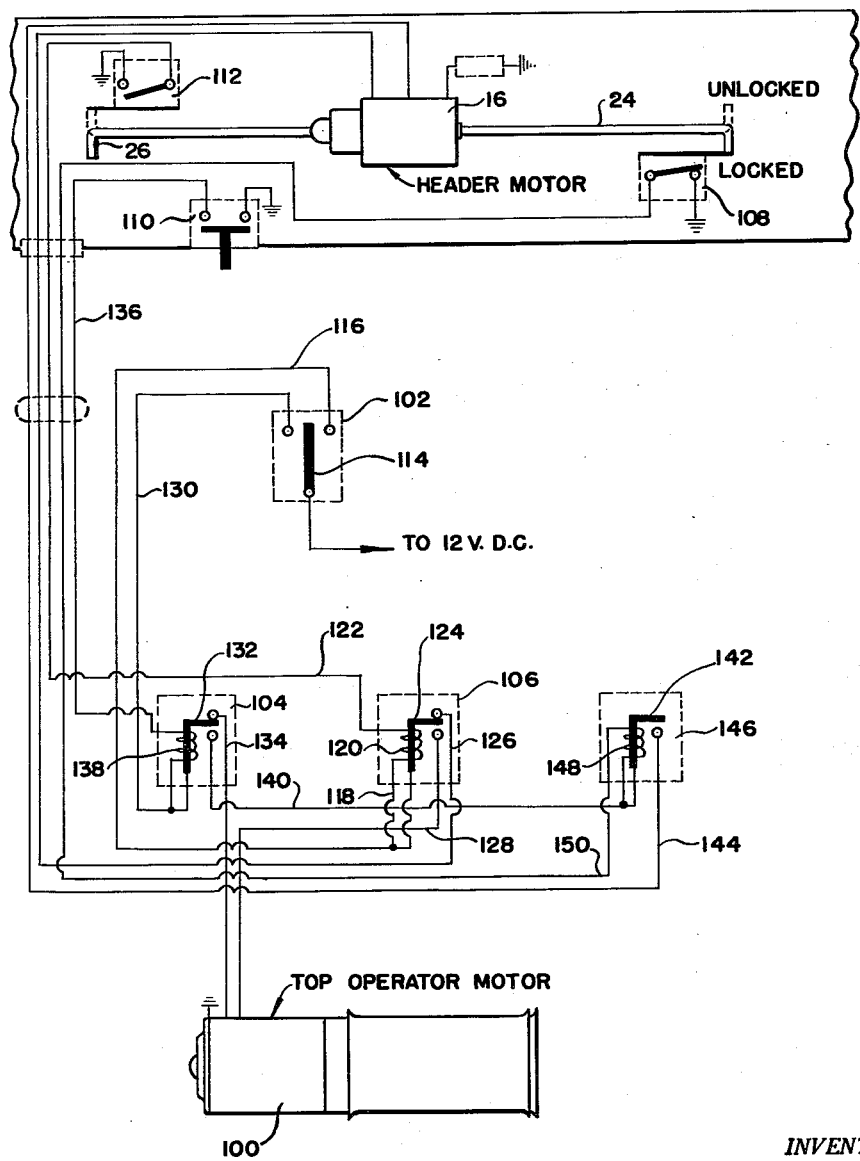
FIG. 12 is a schematic wiring diagram of a complete top operating system.

Reference is made now to FIG. 12 which schematically illustrates a complete power system for a convertible or retractible automobile top wherein the operation of a single switch by the driver will automatically and sequentially unlatch the header and lower the top or, conversely, raise the top and latch the header. In this system, it is contemplated that either an electro-hydraulic top operator or an electro-mechanical top operator be used for raising and lowering the top. The details of these operators are not essential to the invention herein described and have been omitted, but reference is made to McLeod Patent No. 2,388,755, and to Falcon Patent No. 2,230,140, for examples of the types of top operators contemplated.

In FIG. 12, the top operator motor 100 is adapted to be connected to the D.C. automobile supply for up or down top operation by a manual switch 102 and relays 104, 106.

Let it be assumed that the vehicle top is up (closed position). Then switch 108 is open, this switch being normally closed and opened by the latch mechanism in response to the latch reaching its locked position (FIG. 6). Switch 110 is closed, this switch being normally open and operated when the top header hits the windshield header. Switch 112 is open, this switch being normally open and actuated to closed position when the latch is unlocked (FIG. 4).

The switches 108 and 112 are preferably disposed in the top header and are arranged for operation by the crank 80 or by the nut 22. The switch 110 may be carried by either the top header or the windshield header and is operable by the top header in its initial contact with the windshield header. Micro-switches are preferred. The switches themselves have not been shown in the drawing in order to simplify the disclosure.

Operation of the switch 102 (which is disposed on or under the vehicle instrument panel) to connect the switch arm 114 with conductor 116, energizes motor 16 through relay arm 124 and conductor 126. When the latch mechanism reaches unlocked position, switch 112 is closed, thereby energizing coil 120 of relay 106 through line 122. This causes arm 124 to move and energize top operator motor 100 through line 128. The top will then be lowered by the electro-hydraulic or electro-mechanical top operating mechanism, and when the top reaches its open position, the driver releases the operating handle of switch 102.

To raise the top, switch 102 is operated in reverse direction to connect the vehicle battery with line 130 which grounds top operator motor 100 through relay arm 132 and line 134 for operation in top raising direction. As soon as the top header contacts the windshield header, switch 110 will be closed thereby grounding line 136 and energizing coil 138 of relay 104, thereby de-energizing top motor 100 through movement of arm 132. This moves arm 132 to connect with line 140 and arm 142 of relay 146. The coil 148 is also energized through line 150, the switch 108 being closed at this point. The arm 142 then moves and connects lines 140 and 144 which grounds header motor 16 and causes it to operate in latching direction. As soon as the latch mechanism reaches lock position, switch 104 is opened thus de-energizing coil 148 and stopping motor 16. The operator then releases the handle of switch 102 and the top is locked in closed position with the mechanism in readiness for the top to be opened.

I claim:
1. A power operated latch means for latching a vehicle top header to the windshield header of the vehicle comprising, a bracket mounted centrally of the top header, a rotatable screw carried by said bracket, said screw being disposed transversely of said top header, a reversible motor mounted in said top header and drivingly connected to said screw, a rotatable latch bar disposed in said top header having end portions adapted to engage the windshield header, said latch bar being provided with a crank-shaped central portion, a nut threadedly engaged with said screw and operably connected with said crank portion for swinging said crank portion in response to rotation of said screw, and means for selectively energizing said motor to cause latching and unlatching movement of said latch bar.

2. A power operated latch means as claimed in claim 1 wherein said nut is provided with a slot for engaging the crank portion of said latch bar.

3. A power operated latch means for latching a vehicle top header to the windshield of the vehicle comprising a bracket mounted centrally of the top header, a rotatable screw carried by said bracket, said screw being disposed transversely of said top header, a reversible motor mounted in said top header and drivingly connected to said screw, a rotatable latch bar disposed in said top header having end portions adapted to engage a longitudinally extending portion of the windshield header over a substantial range of the relative lateral positions of the vehicle top header with respect to the windshield header, said latch bar being provided with a crank-shaped central portion, a nut threadedly engaged with said screw and operably connected with said crank portion for swinging said crank portion in response to rotation of said screw, and means for selectively energizing said motor to cause latching and unlatching movement of said latch bar.

References Cited in the file of this patent

UNITED STATES PATENTS

| | | |
|---|---|---|
| 2,305,715 | Keller | Dec. 22, 1942 |
| 2,309,926 | Baker | Feb. 2, 1943 |
| 2,411,945 | Vigmostad et al. | Dec. 3, 1946 |
| 2,509,623 | Boade | May 30, 1950 |
| 2,770,489 | Garvey et al. | Nov. 13, 1956 |
| 2,852,292 | Galla | Sept. 16, 1958 |